United States Patent [19]

Jenkner

[11] Patent Number: 5,007,317
[45] Date of Patent: Apr. 16, 1991

[54] APPARATUS FOR THE PROGRAM CONTROLLED LONGITUDINAL AND TRANSVERSE CUTTING OF WORKPIECE PLATES

[76] Inventor: Erwin Jenkner, Lindenstrasse 13, Gechingen, Fed. Rep. of Germany, D-7261

[21] Appl. No.: 508,061

[22] Filed: Apr. 10, 1990

[30] Foreign Application Priority Data

Apr. 10, 1989 [DE] Fed. Rep. of Germany ....... 3911639

[51] Int. Cl.$^5$ .......................... B27B 5/06; B23D 47/04
[52] U.S. Cl. .......................................... 83/256; 83/39;
83/404.1; 83/404.2; 83/732
[58] Field of Search ........ 83/89, 91, 105, 404.1–404.2,
83/404, 84, 86, 90, 407, 732, 417, 93, 35, 44, 47,
256, 39

[56] References Cited

U.S. PATENT DOCUMENTS

| 4,211,130 | 7/1980 | Buckner et al. | 83/86 X |
| 4,317,397 | 3/1982 | Ess | 83/404.1 X |
| 4,341,135 | 7/1982 | Ufermann et al. | 83/404.2 X |
| 4,381,686 | 5/1983 | Ess | 83/256 X |
| 4,765,214 | 8/1988 | Nakaya | 83/91 X |

FOREIGN PATENT DOCUMENTS 3020917 12/1980 Fed. Rep. of Germany .
3540448 5/1987 Fed. Rep. of Germany .

Primary Examiner—Hien H. Phan
Assistant Examiner—Ken Peterson
Attorney, Agent, or Firm—Dick and Harris

[57] ABSTRACT

An apparatus for the program controlled longitudinal and transverse cutting of workpiece plates. A longitudinal cutting saw and a transverse cutting saw are arranged with an intermediate workpiece transport table in-between. Arranged on the intermediate workpiece support table is a lifting device for collecting and lifting end strips cut from workpiece plates by the longitudinal saw above the plane of transport of the cut plate sections, as the cut plate sections are transported onto the transverse saw.

3 Claims, 7 Drawing Sheets

APPARATUS FOR THE PROGRAM CONTROLLED LONGITUDINAL AND TRANSVERSE CUTTING OF WORKPIECE PLATES

BACKGROUND OF THE INVENTION

The present invention relates to saws for workpiece plates, and in particular to an apparatus for the program controlled longitudinal and transverse cutting of workpiece plates.

When a workpiece plate or stack of workpiece plates is to be cut both longitudinally and transversely, typically, for example, a stack of plates would be presented first to a longitudinal saw. A trim cut would be executed to smooth and square the stack. If edge strips were to be cut from the stack of plates, which would be transversely cut in lengths different than those of the plate sections to be cut, the edge strips would be fed directly to the transverse saw in prior art apparata. Then plate sections would be longitudinally cut from the remaining stack, and fed to the transverse saw. The next stack would then be trimmed, the edge strips longitudinally cut and transversely cut, the plate sections longitudinally cut and transversely cut and so on. Such a process, using presently available equipment, is time consuming and inefficient. Further, the cutting of workpiece plates in this manner increases the likelihood that the end strips, since they are being cut in separate operations, may be cut to somewhat different lengths, taking into account the inconsistencies which naturally arise from cutting operation to cutting operation.

It is therefore an object of the invention to provide an apparatus for the program controlled longitudinal and transverse sectioning of workpiece plates having an improved efficiency.

It is a further object of the invention is to provide an apparatus which permits such described end strips to be cut simultaneously, and therefore with the same dimensions.

These and other objects of the invention will become apparent in light of the present specification, claims and drawings.

SUMMARY OF THE INVENTION

The present invention is an apparatus for the program-controlled cutting of workpiece plates into multiple plate sections. The apparatus is operably arranged for the longitudinal cutting of edge strip stacks from workpiece plate stacks, the subsequent longitudinal sectioning of the remaining of the workpiece plate stacks, transverse sectioning of plate piece stacks cut from the workpiece plate stacks and transverse sectioning of the edge strip stacks.

In particular, the apparatus according to the present invention comprises a longitudinal saw for cutting edge strip stacks from the workpiece plate stacks and for cutting the workpiece plate stacks into strip-shaped plate sections. A first advancing device delivers the workpiece plates to the longitudinal cutting saw. A first support table for supporting the workpiece plates is operably associated with the longitudinal cutting saw.

A transverse cutting saw is operably arranged perpendicular to the longitudinal cutting saw. A second advancing device delivers workpiece plate pieces to the transverse cutting saw. A second support table for supporting the workpiece plate pieces is operably associated with the transverse cutting saw. A transport device is provided for moving the edge strip stacks and strip-shaped plate sections from the longitudinal cutting saw to the second support table, to be delivered by the second advancing device to the transverse cutting saw.

A pick up device collects each edge strip stack as it is cut from a workpiece plate stack. The pick up device includes a lifting device for raising the collected edge strip stacks to a collecting position to permit the strip-shaped plate sections to pass under the collected edge strip stacks and advance to the transverse cutting saw.

The lifting device is operably arranged to collect a predetermined number of edge strip stacks. Once the predetermined number of edge strip stacks has been collected, operation of the longitudinal cutting saw is interrupted and the lifting device lowers the collected edge strip stacks for advancement to the transverse cutting saw.

In a preferred embodiment of the invention, the lifting device is upwardly movable from a lower position to a holding position. An intermediate support table having a support surface is operably arranged between the longitudinal cutting saw and the second support table. The transport device includes a conveyor operably arranged beneath support surface of the intermediate support table. Carriers are operably arranged for moving the collected edge strip stacks off of the lifting device, when the lifting device is in the lower position.

The intermediate support table has support rails operably extending in spaced parallel relation between the longitudinal cutting saw and the second advancing device. The carriers, in the preferred embodiment of the invention, are operably arranged between the support rails. The second advancing device includes a side stop for aligning the edge strip stacks prior to transverse cutting. The carriers are operably arranged for moving the collected edge strip stacks against the side stop for alignment prior to transverse cutting, after the carriers have moved the collected edge strip stacks off of the lifting device.

DETAILED DESCRIPTION OF THE DRAWINGS

Figure 1:
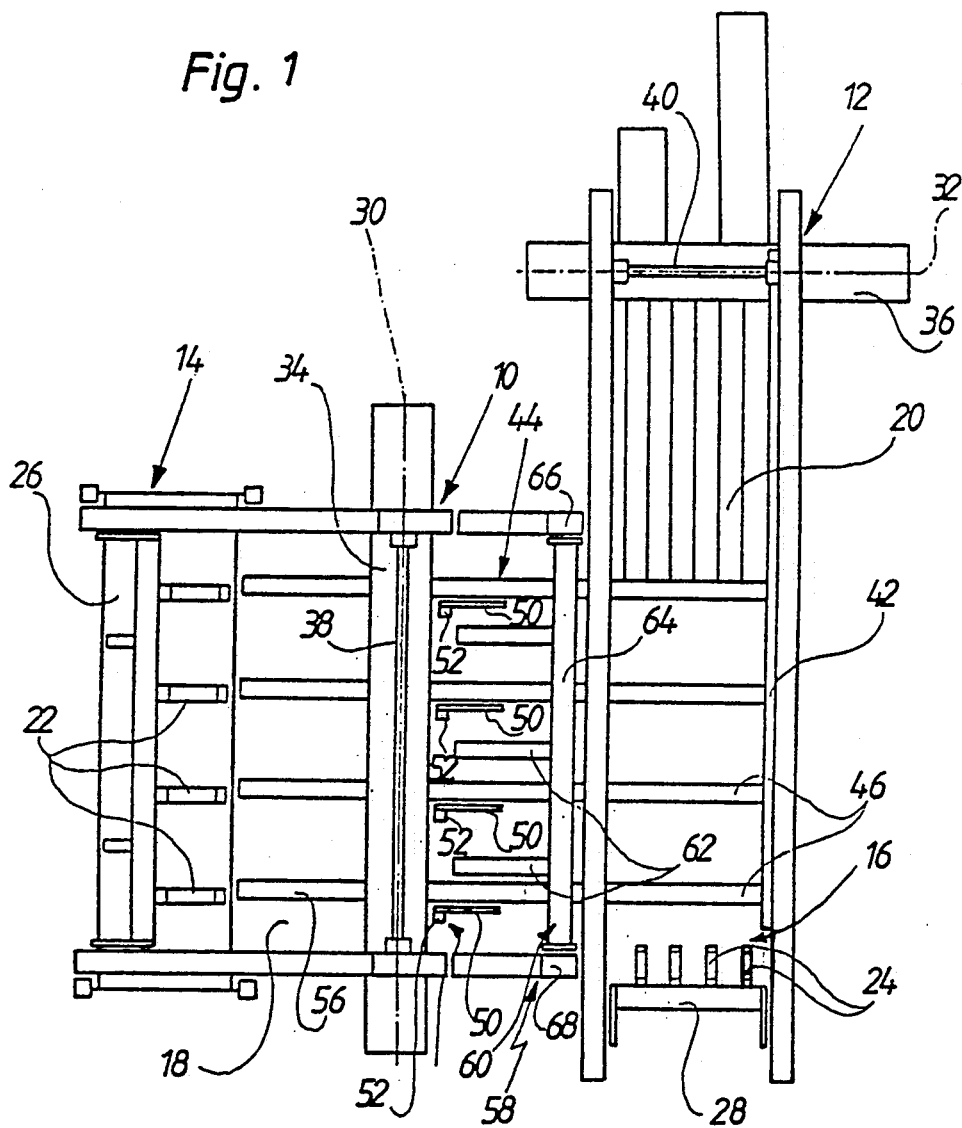
FIG. 1 is a top plan view of a preferred embodiment of the apparatus according to the present invention.

While the present invention is susceptible of embodiment in many different forms, there is shown in the drawings and will herein be described in detail, a specific embodiment, with the understanding that the present disclosure is to be considered as an exemplification of the principles of the invention and is not intended to limit the invention to the embodiment illustrated.

In FIG. 1, reference numeral 10 generally indicates a longitudinal cutting saw. Longitudinal cutting saw 10 is interlinked with transverse cutting saw 12. Installed ahead of longitudinal cutting saw 10, relative to the direction of workpiece movement, is an advancing device 14. Another advancing device 16 is installed before transverse cutting saw 12. These two advancing devices 14 and 16 have workpiece delivery tables 18 and 20, respectively, which are equipped with programmed pushers 26 and 28, respectively, having clamps 22 and 24, respectively.

Longitudinal and transverse cutting saws 10 and 12 are equipped with saw units that move under tables 34 and 36, along parting planes 30 and 32, respectively. Above cutting support tables 34 and 35, are provided clamp bars 38, 40, that can be raised or lowered. Workpiece delivery table 20 of transverse cutting saw 12 is equipped with a side stop 42.

The construction of longitudinal and transverse cutting saws 10 and 12, as well as advancing devices 14 and 16 thereof, are as such known and the details of their particular construction do not constitute a part of the invention. It is therefore clear, that the saw and advancing devices can also be of any other suitable construction.

Between longitudinal cutting saw 10 and advancing device 16 of transverse cutting saw 12, an intermediate table 44 is provided, which extends up to elongated side stop 42 of workpiece delivery table 20. Intermediate table 44 contains a nuimber of support rails 46, which extend horizontally and are positioned parallel to each other at spaced intervals. Support rails 46 extend from adjacent table 34 to side stop 42, which extends along the outer side and above workpiece delivery table 20.

Figure 2:
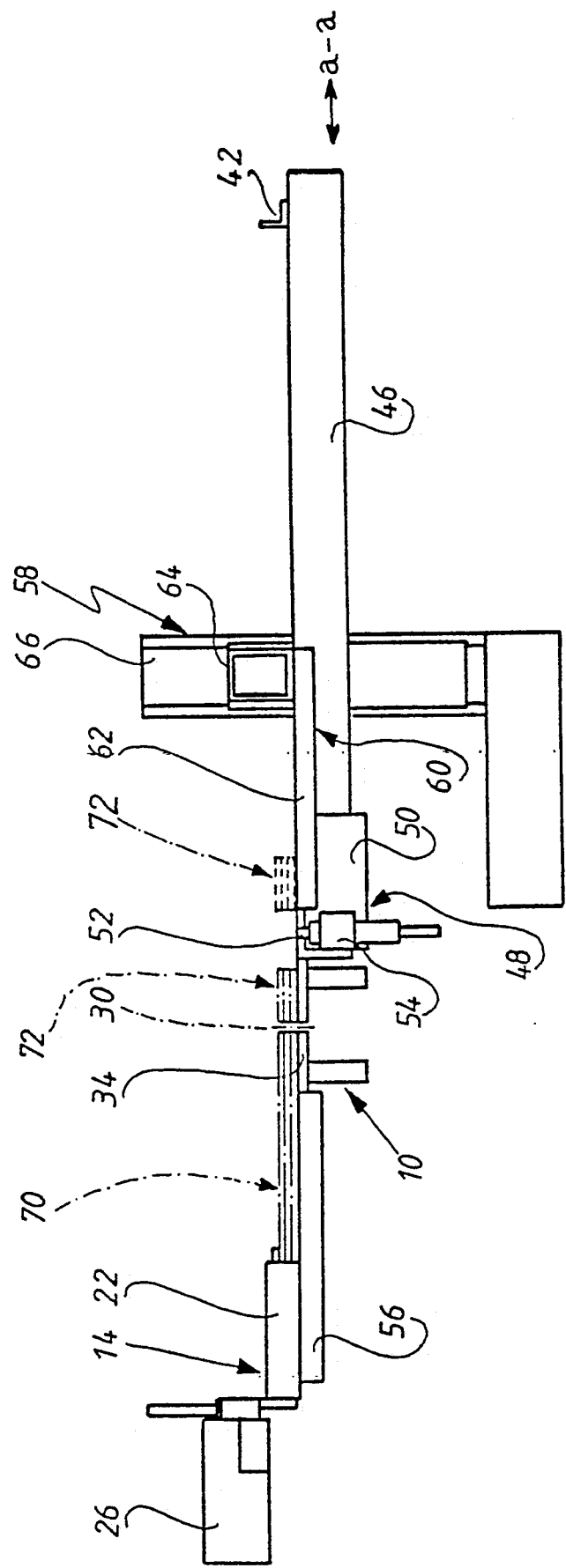
FIG. 2 is a side elevation of the apparatus according to FIG. 1, showing an edge strip stack being cut from a plate stack.

Intermediate table 44 is provided with conveyor 48, as seen in FIG. 2, which includes a carriage 50 for each support rail 46. Each carriage 50 is movable along its respective support rail 46 and includes a carrier 52 which can be extended up over the support rails 46 or the advancing plane, and which can, for example, be constructed from a piston rod of a double-acting pneumatic cylinder.

The workpiece delivery table 18 of the advancing device 14 has a number of support rails 56, each support rail 56 aligned with a respective support rail 46.

A lifting device 58, is provided above the intermediate table 44 and preferably between longitudinal cutting saw 10 and advancing device 16. Lifting device 58 includes edge strip pick-up device or edge strip stack pick-up device 60 which has a number of pick-up arms 62 extending from a cross-bar 64 that extends over intermediate table 44 in the direction of longitudinal cutting saw 10. Each pick-up arm 62 is located, as seen in FIG. 1, between two support rails 46 of the intermediate table 44.

Cross-bar 64 is generally vertically adjustable by program control between a pair of spaced apart lateral guide columns 66 and 68 in such a way that, when cross-bar 64 is in its lower position (see FIG. 2), the top edge of the horizontally extending pick-up arms 62 of cross-bar 64 is in the advancing plane a—a.

Figure 4:
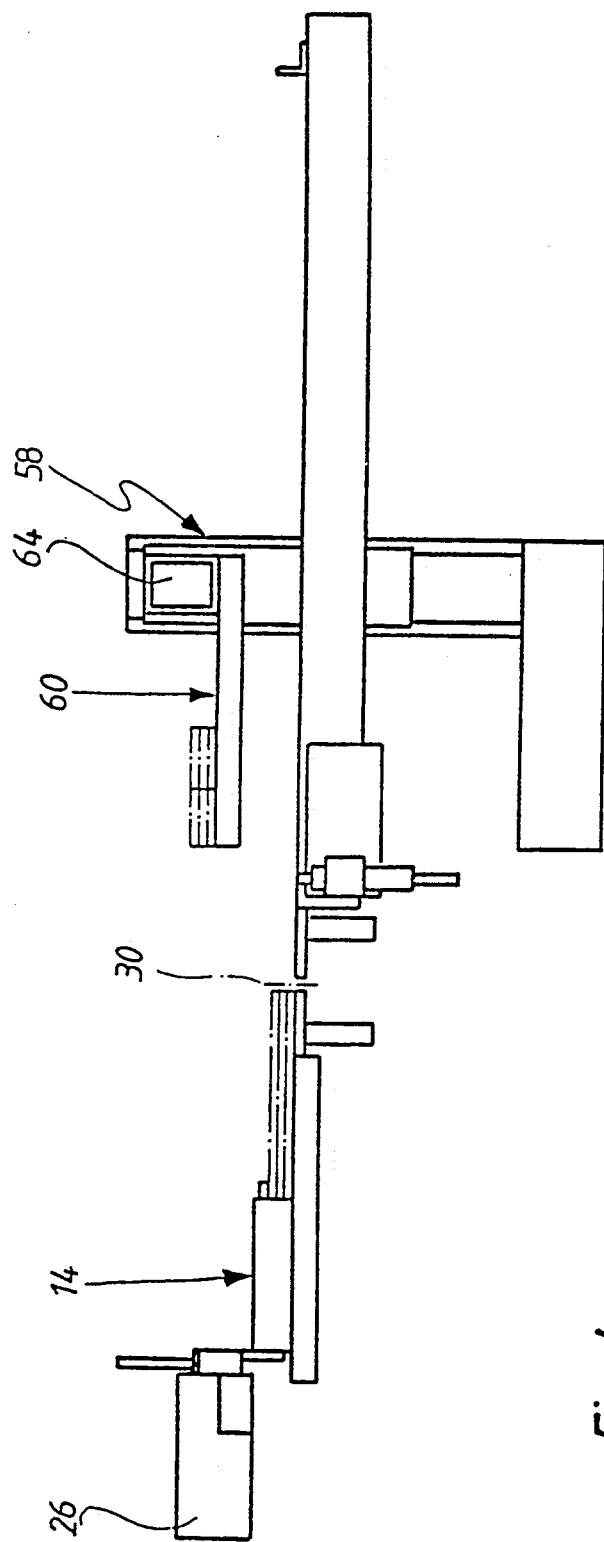
FIG. 4 is a side elevation of the apparatus according to FIG. 1, showing the pick-up device in its raised holding position.

AS FIG. 4 illustrates, the edge strip pick-up device or edge strip stack pick-up device 60 can be directed to a position above the advancing plane a—a, which will be considered again in greater detail below.

In operating the apparatus, a first workpiece plate package stack 70 is placed on the workpiece delivery table 18 of advancing device 14. Plate package 70 is fed by the program actuated pusher 26 to the longitudinal cutting saw 10 to perform an initial trim cut according to a predetermined cutting program. The parted small trim strip (not shown) is carried off behind the cutting support table 34 by way of a trap door that opens downward. Workpiece package 70 is subsequently fed to longitudinal cutting saw 10, after package 70 is secured to cutting support table 34 by means of a clamp bar 38 (not shown in FIG. 2), so that edge strip package 72 of pre-determined width can be parted off from workpiece plate package 70. In this operation of longitudinal cutting saw 10, lifting device 58 is located, as seen in FIG. 2, in its lower, starting position.

Program-actuated pusher 26 then propels plate package 70 forward, in turn pushing edge strip package or stack 72 onto pick-up arm 62 of edge strip pick-up device 60 of lifting device 58, as indicated by broken lines in FIG. 2. Workpiece plate package 70 is then transported in the opposite direction, to the left as seen in FIG. 2. At the same time, edge strip pick-up device 60 is raised to a holding position above the advancing plane a—a and workpiece plate package 70 is subsequently, for execution of a first longitudinal cut, secured anew to cutting support table 34 by clamp bar 38 (not shown) in longitudinal cutting saw 10. After carrying out the first longitudinal parting cut, the workpiece plate package 70 is successively sectioned by longitudinal cutting saw 10, whereupon the resulting strip-shape plate section pieces are transported under raised edge strip pick-up device 60 onto intermediate table 44.

Figure 3:
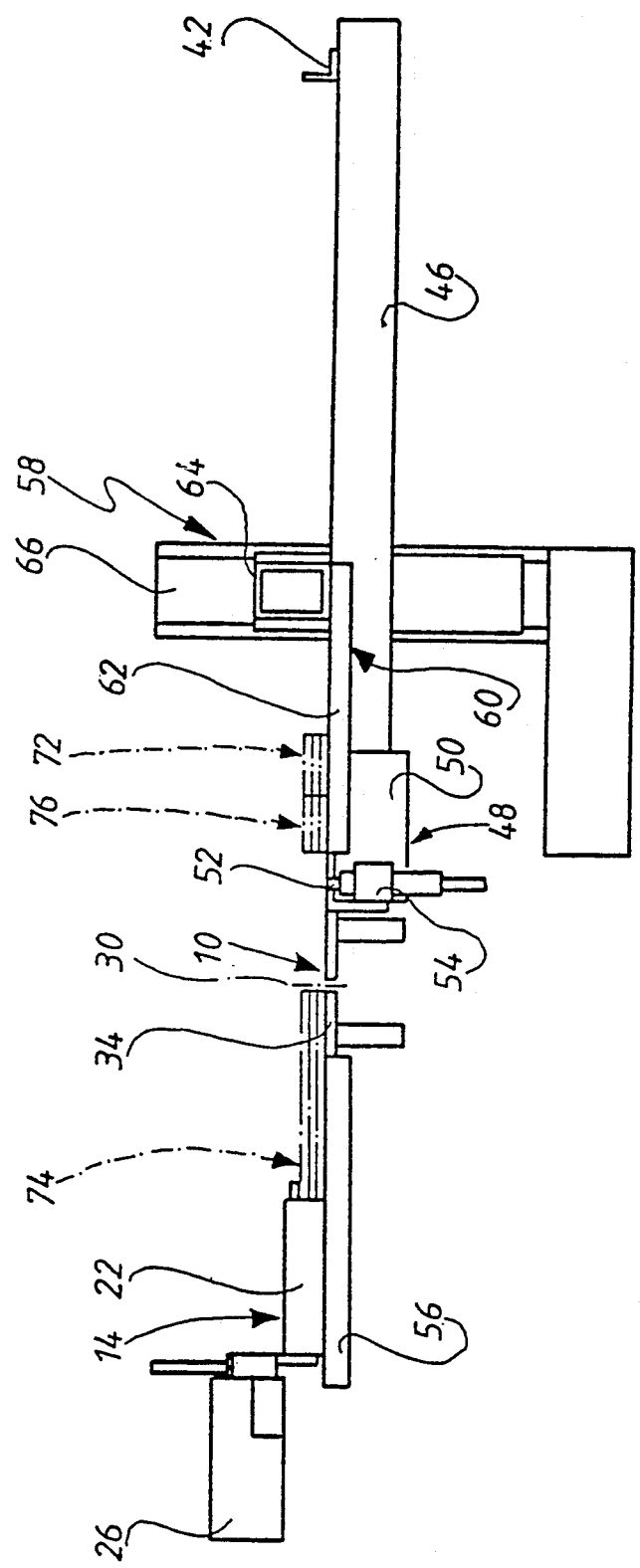
FIG. 3 is a side elevation of the apparatus according to FIG. 1, showing a second edge strip stack being cut from a second plate stack.
Figure 5:
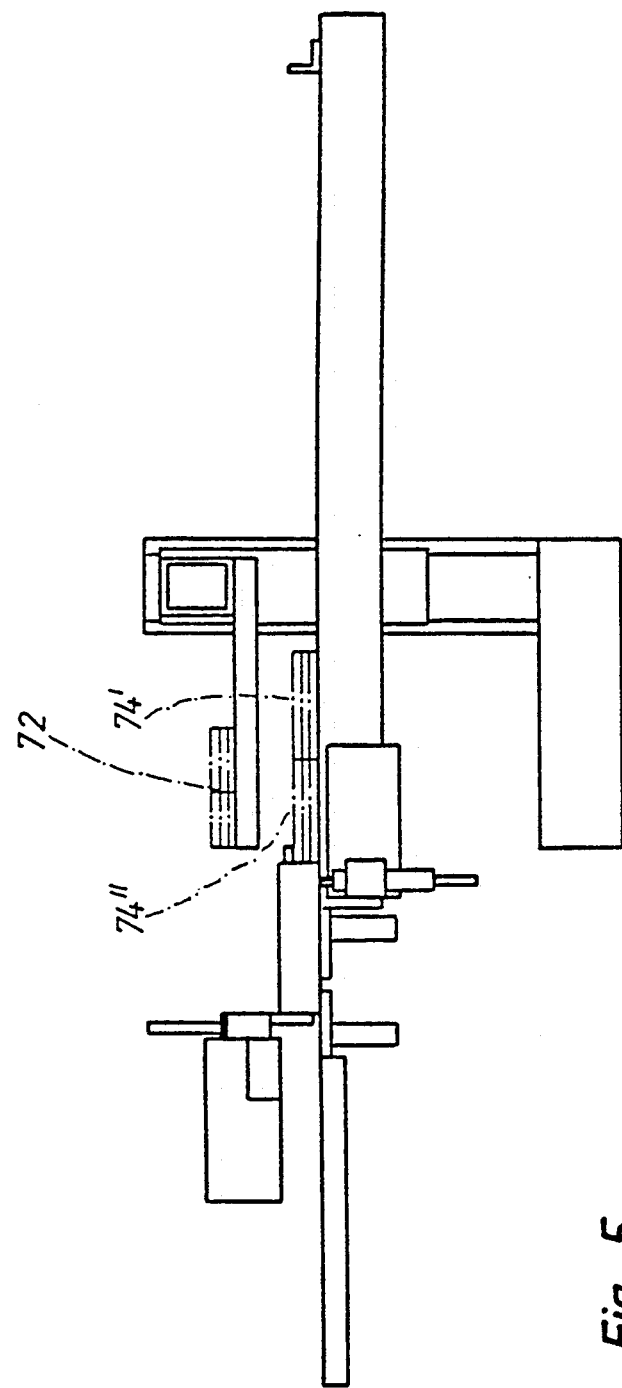
FIG. 5 is a side elevation of the apparatus according to FIG.1, showing plate section stacks being pushed beneath the pick-up device and its collection of edge strip stacks.

After the sectioning of workpiece plate package 70, program actuated pusher 26 and pick-up device are returned to their respective starting positions, seen in FIG. 1, and takes over another workpiece plate stack 70 lying on the workpiece delivery table 18 as seen in FIG. 3. After execution of an initial trim cut, as previously explained, the subsequent workpiece package 70 is fed to longitudinal saw 10 for parting off an edge strip stack 76. When the corresponding sawing operation is carried out, edge strip stack 76 is pushed onto edge strip pick-up device 60 by the corresponding advancement of the remaining workpiece plate stack 74, whereupon edge strip stack 76 is added to edge strip stack 72. Subsequently, edge strip pick-up device 60 is raised again to its holding position (FIG. 4), and the remaining workpiece plate stack 74 is divided into individual strip-shaped plate section pieces 74', 74" which are pushed by program actuated pusher 26 under the raised edge strip pick-up device 60 onto intermediate table 44 (see FIG. 5). Carrier 52 of conveyor 48 is then activated, whereupon program actuated pusher 26 is guided back to its starting position to take over another workpiece plate stack. With the help of conveyer 48, strip-shaped plate section pieces 74', 74" are then fed to advancing device 16 of transverse cutting saw 12, clamped, after angular alignment, in clamps 24 of program actuated pusher 28, and fed to transverse cutting saw 12, to be sectioned transversely, as described hereinafter.

Figure 6:
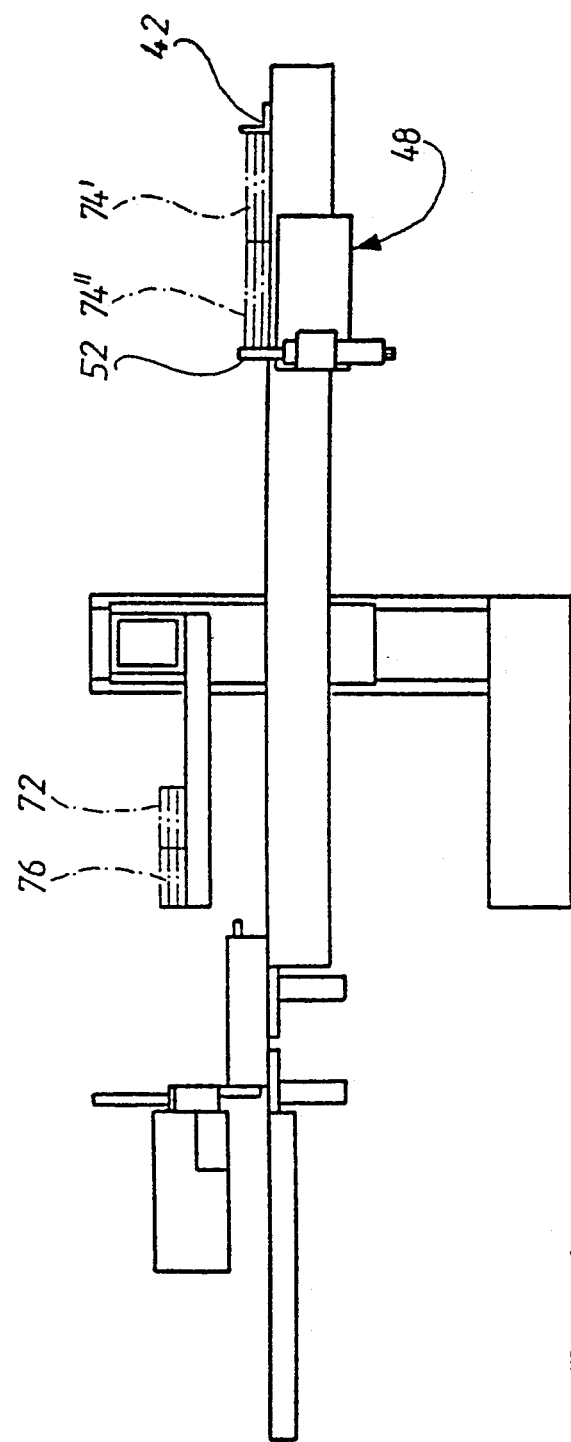
FIG. 6 is a side elevation of the apparatus according to FIG.1, showing plate section stacks being arranged against the side stop prior to transverse cutting.
Figure 7:
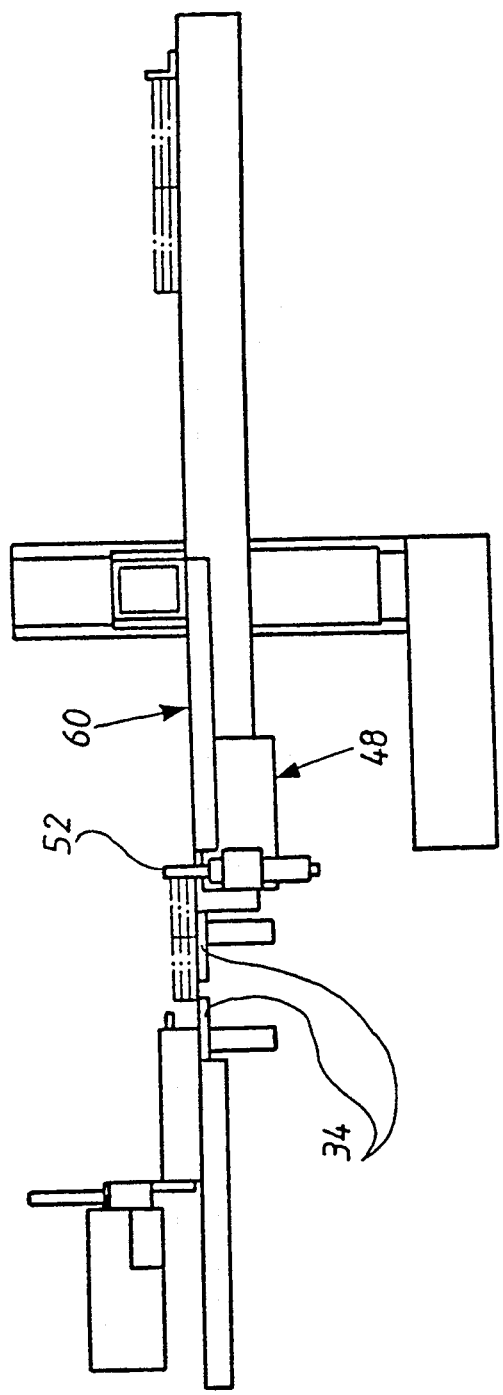
FIG. 7 is a side elevation of the apparatus according to FIG. 1, showing the edge strip stacks being moved from the pick-up device to the support table.

After a predetermined number of plate stacks have had edge strip cuts made, and the remaining longitudinal cuts made, the strip shaped section pieces are ready to be cut transversely. For example, as soon as the accumulated strip-shaped plate stack 74' and 74" are brought to side stop 42 to be aligned as seen in FIG. 6, edge strip pick-up device 60 is returned back to its starting position, as shown in FIG. 7. Edge strip stacks 72 and 76 are then pushed by carriers 52 from edge strip pick-up device 60 onto the support table 34. Carriers 52 of conveyer 48 then are lowered below the advancing plane a—a, edge strip pick-up device 60 is raised to its holding position, and program-actuated pusher 26 pushes the two edge strip stacks 72 and 76 to a position to the right of carriers 52, as indicated in FIG. 3. carriers 52 are then activated by the program control. Whereupon conveyor 48 brings edge strip stacks 72 and 76 up against side stop 42 for alignment and squaring (not shown), before they are gripped by clamps 24 of program-actuated pusher 28 and fed to transverse cutting saw 12.

In the meantime, program-actuated pusher 26 can be returned back to its starting position, as seen in FIG. 1, and another workpiece plate stack brought up to workpiece delivery table 18.

The number of workpiece plate packages that can be sectioned, is limited merely by the number of edge strip stacks 72 and 76 that can be cut from the plate stacks and picked up by edge strip pick-up device 60. Once pick-up device 60 has become filled with edge strip stacks, further longitudinal cutting on a workpiece plate stack by longitudinal cutting saw 10 is temporarily halted. The edge strip stacks are pushed by edge strip pick-up device 60 side stop 42, to be subsequently fed to transverse cutting saw 12 to be transversely cut into lengths different than the lengths of the strip-shaped plate pieces. Then the work cycle of loading the edge strip pick-up device 60 with edge strip stacks 72, 76 can begin anew.

In an alternative embodiment for practicing the present invention, the edge strip pick-up device is designed in such a way that edge strip stacks 72, 76, will not have to be advanced to the left for extraction from the edge strip pick-up device 60 by carriers 52, as seen in FIG. 7, and then to the right by the program-actuated pusher 26 to a take-over position for the carriers 52, as seen in FIG. 3, after edge strip pick-up device 60 has been raised again. In particular, the edge strip pick-up device may be modified so that edge strip stacks 72, 76 may be pushed directly off of the picking device to side stop 42. Such modification of the pick-up device would require a different guiding means for the vertical guiding of edge strip pick-up device 60 to eliminate cross-bar 64 so as not to obstruct a push-off operation. After stacks 74' and 74" are taken to side stop 42, carriers 52 could be returned to their starting positions, be returned to their lower release positions, so that carriers 52 could be moved under and past edge strip stacks 72, 76 and subsequently returned to their starting positions to push edge strip stacks 72, 76 off from the modified edge strip pick-up device.

The foregoing description and drawings merely explain and illustrate the invention and the invention is not limited thereto except insofar as the appended claims are so limited, as those skilled in the art who have the disclosure before them will be able to make further modifications therein without departing from the scope of the invention.

What is claimed is:

1. An apparatus for the program-controlled cutting of workpiece plates into multiple workpiece plate pieces, said apparatus being operably arranged for longitudinal cutting of edge strip stacks from workpiece plate stacks, subsequent longitudinal sectioning of said workpiece plate stacks into workpiece plate piece stacks, transverse sectioning of said plate piece stacks cut from said workpiece plate stacks, and transverse sectioning of said edge strip stacks, said apparatus for the program-controlled cutting of workpiece plates into multiple workpiece plate pieces comprising:

a longitudinal cutting saw for cutting said edge strip stacks from said workpiece plate stacks and for cutting said workpiece plate stacks into said workpiece plate piece stacks;

a first advancing device for feeding said workpiece plate stacks to said longitudinal cutting saw;

a first support table for supporting said workpiece plate stack as they are fed to said longitudinal cutting saw by said first advancing device;

a transverse cutting saw for cutting said workpiece plate piece stacks and said edge strip stacks, operably arranged generally perpendicular to said longitudinal cutting saw;

a second advancing device for feeding said workpiece plate piece stacks and said edge strip stacks to said transverse cutting saw;

a second support table for supporting said workpiece plate piece stacks and said edge strip stacks as they are fed to said transverse cutting saw by said second advancing device;

a transport device for moving said edge strip stacks and said workpiece plate piece stacks from said longitudinal cutting saw to said second support table; and a pick-up device for collecting each said edge strip stack as it is cut from a workpiece plate stack, up to a predetermined number of edge strip stacks, said pick-up device including a lifting device for raising said collected edge strip stacks to a holding position to permit said workpiece plate piece stacks to pass under said collected edge strip stacks and advance to said transverse cutting saw, said lifting device being operably arranged to collect said predetermined number of edge strip stacks so that once said predetermined number of edge strip stacks has been collected, operation of said longitudinal saw is interrupted, said lifting device lowers said edge strip stacks from said holding positions for advancing to said transverse saw for transverse cutting.

2. The apparatus for the program-controlled cutting of workpiece plate stacks into multiple workpiece plate piece stacks, according to claim 1, further comprising:

said lifting device being upwardly movable from a lower position to said holding position;

an intermediate support table operably arranged between said longitudinal cutting saw and said second support table;

said intermediate support table having a support surface, said transport device including a conveyer operably arranged beneath said support surface of said intermediate support table, said conveyer including carriers raisable above said support surface of said intermediate support table, said carriers being operably arranged for moving said collected edge strip stacks off of said lifting device when said lifting device is in said lower position.

3. The apparatus for the program-controlled cutting of workpiece plate stacks into multiple workpiece plate piece stacks, according to claim 2, further comprising:

said intermediate support table having support rails, operably extending in spaced parallel relation between said longitudinal cutting saw and said second advancing device;

said carriers being operably arranged between said support rails;

said second advancing device including a side stop, said carriers being operably arranged for moving said collected edge strip stacks against said side stop, for alignment prior to transverse cutting, after said carriers have moved said collected edge strip stacks off of said lifting device.

* * * * *

UNITED STATES PATENT AND TRADEMARK OFFICE
CERTIFICATE OF CORRECTION

PATENT NO. : 5,007,317

DATED : April 16, 1990

INVENTOR(S) : Erwin Jenkner

It is certified that error appears in the above-identified patent and that said Letters Patent is hereby corrected as shown below:

| | |
|---|---|
| Col. 1, Lines 42 and 43 | Delete "specification, claims and drawings." and insert instead -- Specification, Claims and Drawings.--. |
| Col. 5, Line 10 | Delete "carriers" and insert instead -- Carriers --. |
| Col. 5, Line 11 | Delete "control. Whereupon" and insert instead -- control, whereupon --. |
| Col. 6, Line 14 | Delete "stack" and insert instead -- stacks --. |
| Col. 6, Line 50 | Delete "claim" and insert instead -- Claim --. |
| Col. 6, Line 68 | Delete "claim" and insert instead -- Claim --. |
| Col. 3, Line 35 | Delete "nuimber" and insert instead -- number --. |

UNITED STATES PATENT AND TRADEMARK OFFICE
CERTIFICATE OF CORRECTION

PATENT NO. : 5,007,317
DATED : April 16, 1991
INVENTOR(S) : Erwin Jenkner

It is certified that error appears in the above-identified patent and that said Letters Patent is hereby corrected as shown below:

Column 3, line 40 Delete "conveyor" and insert --conveyer--.

Signed and Sealed this

Ninth Day of February, 1993

Attest:

STEPHEN G. KUNIN

Attesting Officer

Acting Commissioner of Patents and Trademarks